US008443852B2

(12) United States Patent
McCaughey

(10) Patent No.: US 8,443,852 B2
(45) Date of Patent: May 21, 2013

(54) TYRE INFLATION/DEFLATION DEVICE

(75) Inventor: Mark Christopher McCaughey, Scunthorpe (GB)

(73) Assignee: Pneumatic Components Limited, Sheffield (GB)

( * ) Notice: Subject to any disclaimer, the term of this patent is extended or adjusted under 35 U.S.C. 154(b) by 0 days.

(21) Appl. No.: 13/469,155

(22) Filed: May 11, 2012

(65) Prior Publication Data
US 2012/0285581 A1  Nov. 15, 2012

Related U.S. Application Data

(60) Provisional application No. 61/485,742, filed on May 13, 2011.

(51) Int. Cl.
*B65B 31/00* (2006.01)
(52) U.S. Cl.
USPC .............. 141/237; 141/38; 141/66; 141/98
(58) Field of Classification Search
USPC ................ 141/38, 65–66, 94, 98, 231, 237
See application file for complete search history.

(56) References Cited

U.S. PATENT DOCUMENTS

| 5,967,198 | A  | * | 10/1999 | Smalley | 141/38 |
| 6,155,313 | A  | * | 12/2000 | Smalley | 141/38 |
| 6,286,565 | B1 | * | 9/2001  | Pike | 141/38 |
| 7,137,417 | B2 | * | 11/2006 | Kroll et al. | 141/66 |
| 7,258,140 | B2 | * | 8/2007  | Acree | 137/899.4 |
| 7,597,121 | B2 | * | 10/2009 | Flournoy | 141/98 |
| 7,624,774 | B2 | * | 12/2009 | Lighter | 141/237 |
| 7,677,274 | B2 | * | 3/2010  | Lighter | 141/4 |
| 7,770,608 | B2 | * | 8/2010  | Lighter | 141/8 |
| 7,975,731 | B2 | * | 7/2011  | Shultz et al. | 141/38 |
| 8,091,590 | B2 | * | 1/2012  | Graham | 141/38 |
| 8,196,616 | B2 | * | 6/2012  | Lighter | 141/38 |
| 2006/0272732 | A1 | | 12/2006 | Lighter | |
| 2008/0271810 | A1 | | 11/2008 | Shultz et al. | |
| 2012/0007730 | A1 | * | 1/2012 | Vecht-Lifshitz et al. | 340/442 |

FOREIGN PATENT DOCUMENTS

| JP | 2000118366 A | 4/2000 |
| JP | 2002114136 A | 4/2002 |

* cited by examiner

*Primary Examiner* — Timothy L Maust
*Assistant Examiner* — Timothy Kelly
(74) *Attorney, Agent, or Firm* — King & Schickli, PLLC

(57) ABSTRACT

A device (1) for effecting automatic nitrogen filling, or nitrogen-for-air substitution, for the simultaneous inflation/deflation of a plurality of vehicle tires, comprising multiple controllers (17) corresponding to the number of tires to be inflated/deflated, each having an individual display (8), a pressure sensor (9), an inflation valve (4) and a deflation valve (11), whereby multiple vehicle tires may be inflated/deflated simultaneously, with user input interfaces (10) for pressure setting adjustments.

17 Claims, 2 Drawing Sheets

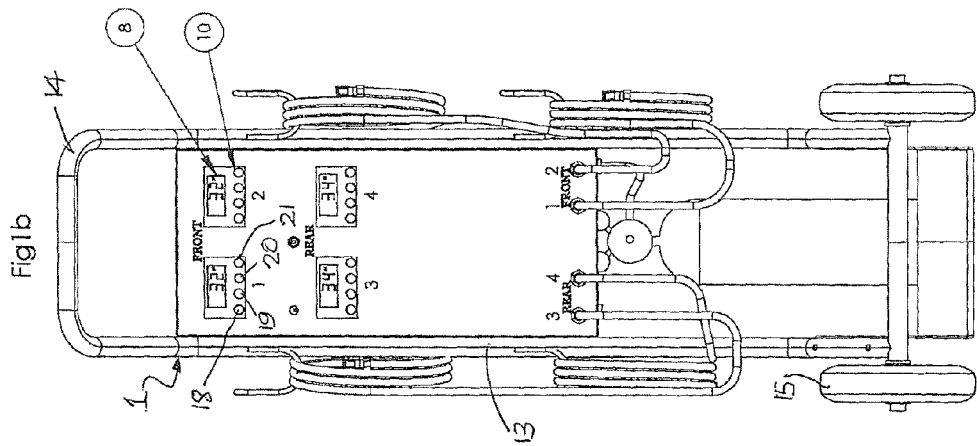
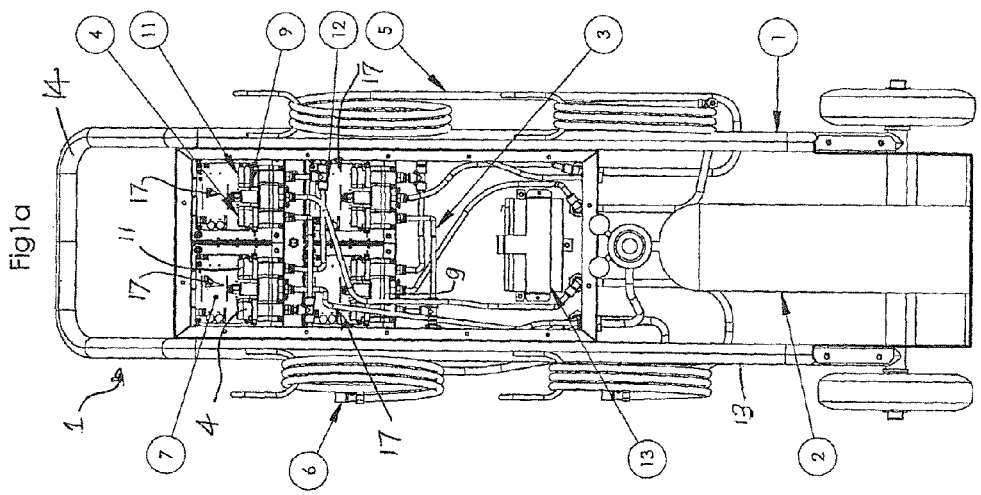

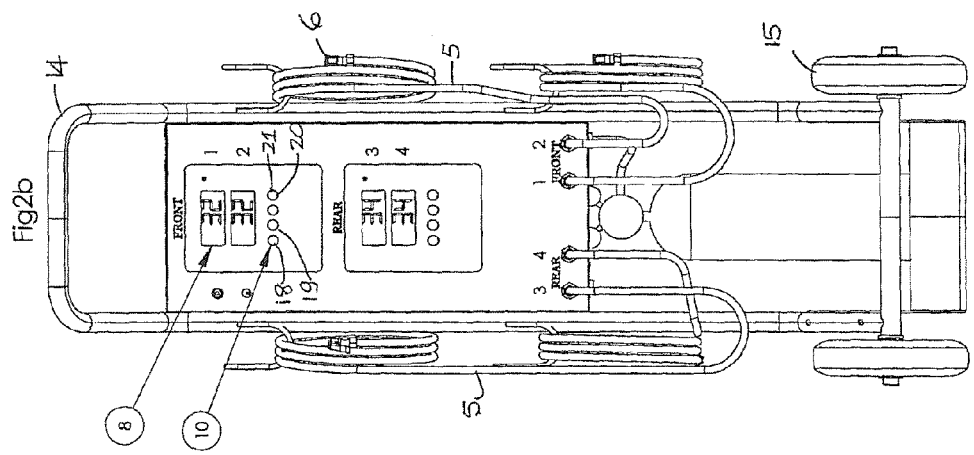
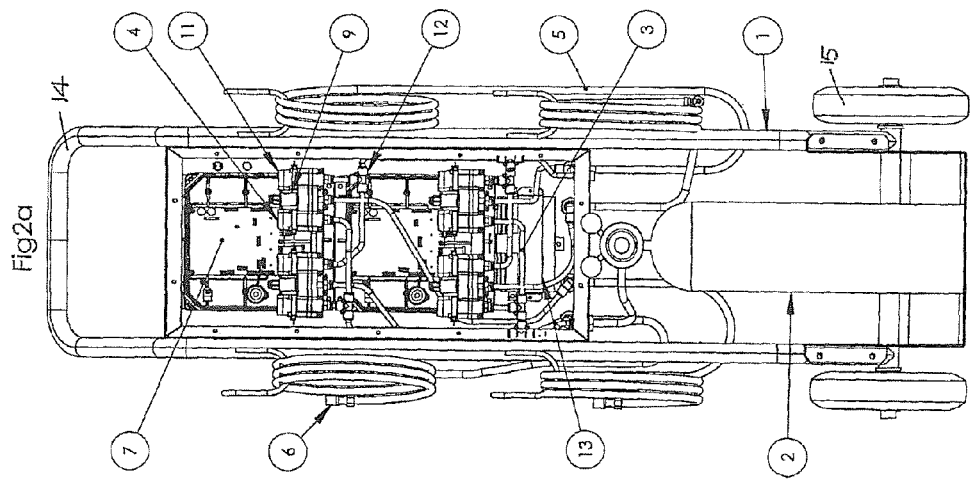

TYRE INFLATION/DEFLATION DEVICE

This application claims the benefit of U.S. application Ser. No. 61/485,742 filed May 13, 2011.

FIELD OF THE INVENTION

This invention relates to a tyre inflation device useable for both nitrogen-for-air substitution in multiple tyre configurations, and for nitrogen top-off in tyres already inflated with nitrogen, particularly for automobiles, but equally useable for the tyres of commercial vehicles, or motorcycles.

BACKGROUND OF THE INVENTION

Digital automatic preset tyre inflation is now well recognized as being a common method and device for filling and regulating of automotive vehicle tyres throughout the world, since the early 1990's.

All such devices feature a controller, a processor, a pressure sensor, a visual display and a user interface for setting user-requested target pressures. A control algorithm enables the controller to regulate the gas to the required pressure. By use of a pre-settable pressure target, the processor allows efficient automatic inflation/deflation of the automotive tyre to the required setting.

In certain markets and applications it is advantageous to convert the air mixture contained within the tyre to a nitrogen rich mixture. It is well documented that filling tyres with a nitrogen rich mixture has advantages for the tyre and the motorist, these are:
- dry nitrogen carries no water vapour, this provides cooler running avoiding the conversion of water to steam, as water vapour can vary the tyre pressure enormously;
- reduction in tyre life due to premature ageing of the tyre carcass, through oxidisation and corrosion of steel reinforcements; and
- improved retention of the tyre pressure, through a reduced rate of permeation through the tyre wall due increased nitrogen molecule size over oxygen. This process is slowed if the nitrogen mix is between 93% and 98% dependent upon the tyre pressure required over a conventional air mixture.

During the nitrogen-for-air substitution process, the tyre(s), previously inflated with compressed air, are purged and re-inflated with a nitrogen rich gas source. This process of deflation and inflation is repeated until the tyre $N_2$ mix lies in the 93% to 98% range previously referred to.

To minimise the cycle time for such purging operations, a single controller and sensor can be connected to a plurality of outlets i.e. air/gas hoses to the tyres, with the opportunity for venting the tyres with standard air mixture, the tyres in one system being in communication with one another via a distribution manifold.

However there are significant disadvantages in the above approach of utilising one pressure sensor in monitoring a multiple tyre application via an outlet tyre hose distribution manifold.

Firstly, the user cannot guarantee an equal tyre pressures due to the possibility of different flow rates through the tyre valves as the sensor can only measure an average pressure. With different flow rates through the tyre valves and also the possibility of different front to back tyre sizes, the accuracy of all tyres having the same pressure cannot be guaranteed. For example, to purge and fill four tyres to a target pressure of 30 psi, it is possible for the inflator to be in equilibrium at pressures of 33, 32, 28, 27 psi, as some of the tyres may fill more slowly than others. If the hoses are removed too soon from the tyre valves, then the pressures will be above or below the desired target.

To counter this occurrence a long balance delay must be allowed for in order to achieve the correct pressure equalization in all the tyre(s) and must be understood, and followed, by the user.

In markets with heavy regulation for tyre inflation equipments such as Germany this approach of one sensor being in communication with multiple tyres is not allowed.

Secondly, difficulties also arise in the detection of very minor leaks, in that ensuring equal tyre pressures becomes increasingly difficult when monitoring a shared tyre volume (with minor leaks) due to the total volume of all the cumulative tyres with leakage caused for example by incorrectly seated hose chucks.

Indeed, it is possible that one of the hose chucks can become detached and/or not connected securely to the tyre valve. This is made worse by the necessity for the hose chucks to be of normally of 'closed end' construction. Thus, the user may not be aware of the deficiency during the start or during the tyre purging and filling process, and may mean that one of the tyres has been improperly converted to the desired nitrogen purity.

Thirdly, a requirement for different front or rear tyre pressures, necessitates inflating all the tyres to one fixed pressure, with subsequent disconnecting of two hoses and re-inflating or deflating the two connected tyres to the new target pressure. This increases the total time to complete the nitrogen-for-air substitution time cycle.

Fourthly, removes the need for a manually operated relief valve to enable the process start and end the process to be terminated.

Fifthly, the tyre inflation process, when working with a plurality of tyres, must be started with all tyres at approximately the same pressure to ensure approximately equal tyre filling is achieved at the end of the process.

OBJECT OF THE PRESENT INVENTION

A basic object of the present invention, is the provision of an improved tyre inflator/deflator device for use in effecting nitrogen-for-air substitution, or nitrogen top-off of motor vehicle tyres.

SUMMARY OF THE INVENTION

According to the present invention, there is provided a device (1) for effecting automatic nitrogen filling, or nitrogen-for-air substitution, for the simultaneous inflation/deflation of a plurality of vehicle tyres, comprising multiple controllers (17) corresponding to the number of tyres to be inflated/deflated, each having an individual display (8), a pressure sensor (9), an inflation valve (4) and a deflation valve (11), whereby multiple vehicle tyres may be inflated/deflated simultaneously, with user input interfaces (10) for pressure setting adjustments.

ADVANTAGES OF THE INVENTION

The device in accordance with the invention offers a novel way of achieving the nitrogen-for-air substitution for multiple vehicle tyres, using a plurality of controllers and tyre pressure displays, with each tyre being sensed by a discrete pressure sensor. Control of inflation and deflation is achieved by single control valve. The device is equally useable for the top-off or top-up, of tyres already inflated with nitrogen.

PREFERRED OR OPTIONAL FEATURES OF THE INVENTION

Each controller includes a processor located on a PCB.

Four controllers and four associated inflation/deflation hoses are provided.

Means is provided enabling simultaneous setting of a target pressure by linking adjacent controllers via an interface link between the processors Independent control means with simultaneous completion on paired/multiple displays is provided. This caters for the situation where both controllers are inflating separate tyres independently, and both displays could reach the target pressure and settle within tolerance, but the left tyre may inflate quicker than the right tyre, and to avoid the mistake of the mechanic removing the wrong hose i.e. with the right tyre still inflating, the pairs of displays are synchronised i.e. effectively one of the controllers may sit at the required target pressure, but only when the other controller has reached the target pressure is the end of the cycle announced.

Means is provided to effect independent completion of inflation/deflation of individual tyres. This allows both independent control and independent indication of cycle end by buzzer and display indication.

Multiple displays and individual pressure control to each controller utilising one processor, using a multiplexed control of an inflation algorithm are provided.

Independent tyre inflation control and independent indication of an inflation/deflation cycle are provided.

Independent tyre control but with completion when both hoses are in the end state of cycle completion is effected. Simultaneous synchronisation of "end of cycle" is required on the single display, as the two independent valves/sensors cannot be distinguished.

A single display but with dual pressure sensing and dual control of inflate/deflate valves for inflating/purging of tyres in pairs, with simultaneous completion at the end of the cycle is provided.

BRIEF DESCRIPTION OF THE DRAWINGS

FIG. 1a, 1b are respectively rear and front elevations of a first embodiment of a device for effecting automatic nitrogen-for-air substitution for the inflation/deflation of four pneumatic tyres.

FIG. 2a, 2b are respectively rear and front elevations of a second embodiment of device.

DETAILED DESCRIPTION OF THE DRAWINGS

In both embodiments, a tyre inflator/deflator device (1) in accordance with the invention is installed on a tubular metal stand (13) with a handle (14) and ground wheels (15), for portability. The stand could alternatively be wall mounted, or directly mounted to a nitrogen gas generator system. A bottle (2) of nitrogen gas is indicated on the stand (13).

Both embodiments are aimed at inflating/deflating the most widely used tyre configuration—four—on an automobile. To this end, each stand (13) is provided with four controllers (17) each comprising an inflation valve (4), a deflation valve (11) and a pressure sensor (9).

Nitrogen delivery lines (3) are piped to the four inflation valves (4), with each of four tyres in communication with the device (1) via a hose (5), each hose (5) having a suitable connector (6) to interface with a conventional tyre valve.

A processor located on a PCB (7) may be individual and contain a single, digital, tyre pressure display (8) in the embodiment of FIGS. 1a and 1b, or contain a plurality of LCD tyre pressure displays (8) in the embodiment of FIGS. 2a and 2b. The individual pressure sensors (9) communicate via the hoses (5) with individual tyre pressures and are connected singularly to the PCB (7) or via multiple sensors (9) to the PCB (7).

The setting of individual tyre pressures is via keys at a user interface (10). In detail, key (18) is for increasing the set pressure above the 32 and 34 p.s.i. display in FIGS. 1b and 2b. The key (19) is for decreasing the 32 or 34 p.s.i. display. The key (20) is for the top-off, or top-up, of a tyre already filled with nitrogen to a required higher (but sometimes lower) pressure. Finally key (21) is for initiatting the purging cycle of the device (1), to substitute nitrogen-for-air in a tyre previously filled with compresses air.

In practice, the predominant use of the device (1) will be for the tyres of four-wheeled automobiles, which can be deflated and inflated in situ, as can the tyres of a motorcycle. For a commercial vehicle however, the wheels would normally be removed.

For a flat tyre condition, the purging cycle must be initiated by pressing key (21). During tyre gas conversion, the separate inflation valves (4) are opened (for inflation) and the duration of opening is determined from the rate of pressure increase from pressure measurement at the sensor (9). The process is repeated for deflating or purging of tyres by opening of deflation valves (11). Exhaust gas is conveyed via common piping (12) to atmosphere.

Electrical power is supplied from a battery (13), but a regulated DC supply or AC mains are equally usable.

For the plurality of controllers (17) with single display as in (FIG. 1a, 1b), these can be linked by common interface to allow for the simultaneous adjustment of the target set pressure on one of the user interfaces (10), for the front pair of tyres or the rear pair of tyres. Thus, manual setting of the desired tyre pressure by the keys of one interface (10) of one controller (17), will automatically set the other controller (so that both tyres of a front or rear pair have the same target pressure).

For multiple displays (FIG. 2a, 2b) on one control processor, the same pressure selection is always shown on the different displays (8).

For multiple displays on the single processor PCB, this control is multiplexed at high speed to maintain the desired independent control.

Each individual display (8) may be configured for its own completed cycle annunciation, or completion of pair of inflated displays is announced both visually by "END" being displaced in place of 32, 34 etc, and audibly, by the sounding of a buzzer, as the display panel may not be in line of sight of the user when pair of (front or rear) tyres are at the "end" condition.

The stand (13) has clear signage—1, 2, 3, 4—to indicate the identification of each controller display with same markings on the end of the hoses (5) or their chucks by number or similar. In addition an audible and LCD blinking showing the 'END' status can be configured to sound indicate when nitrogen—for air substitution of each pair of opposed tyres—is complete. This is to ensure the correct hose (5) is removed. When only the two wheels of a motorcycle are involved, then consider FIG. 1b. the two left-hand hoses would be attached to the valves of the front and rear tyres, and the interfaces 10 signed as 1 and 2 would be used to input the desired pressure, with keys 18 and 19 pressed appropriately, and then either key 20 pressed (if the tyres are already nitrogen filled) or key 21 pressed (if nitrogen-for-air substitution is required).

The individual hoses (5) connected to the individual tyres allow for the continuous pressure feedback and adjustment at the cycle end condition. In general, to convert four automobile tyres from compressed air filled to compressed nitrogen filled, two cycles (deflation, inflation with nitrogen, deflation, inflation with nitrogen) will achieve the desired nitrogen content of e.g. 95%.

The hoses (5) have 'open end' tyre connectors whereby removal of a hose (5) from a tyre valve allows the pressure sensor (9) to sense atmospheric zero at which point the cycle is stopped for each controller (17) in this state.

For hoses (5) with "closed end" tyre connectors, the cycle end condition is terminated via a periodic small deflate pulse with the rate of decay being measured. The processor determines the volume change of pressure with time and calculates a rate of deflation. A limit is set within the processor to determine if the rate of change reflects pressure in a hose or pressure in a tyre. If the former is true, the remaining pressure in the hose is expelled via a deflate port on the control valve (9). With the pressure sensing atmospheric zero, the process is ended.

What I claim is:

1. A device (1) for effecting automatic nitrogen filling from a nitrogen source, or nitrogen-for-air substitution, for the simultaneous inflation/deflation of a plurality of vehicle tyres, comprising:
    multiple controllers (17), each of said controllers adapted to deliver nitrogen to at least one of the tyres based at least partially on a pressure within that tyre, each controller including a processor located on a PCB and each controller being in communication with each of the following:
        an individual display (8) for displaying the pressure in the tyre;
        a pressure sensor (9) for sensing the pressure in the tyre;
        an inflation valve (4) for receiving nitrogen from the nitrogen source and delivering the nitrogen to the tyre;
        a deflation valve (11) for releasing pressure from the tyre; and
    means for enabling simultaneous setting of a target pressure by linking two of the multiple controllers via an interface link between the processors;
    whereby the plurality of vehicle tyres may be inflated/deflated simultaneously, with user input interfaces (10) for pressure setting adjustments.

2. A device as claimed in claim 1, comprising four controllers (17), and four associated inflation/deflation hoses (5).

3. A device as claimed in claim 1, the multiple controllers comprising a first and a second independent controller adapted to coordinate simultaneous completion of inflation/deflation associated with at least two individual displays (8).

4. A device as claimed in claim 1, wherein each of the multiple controllers is adapted to effect independent completion of inflation/deflation of individual tyres and independently indicate completion of a given inflation/deflation cycle.

5. A device as claimed in claim 1, wherein each controller is in communication with multiple individual displays (8), multiple individual pressure sensors, and inflation valves; and
    wherein each controller utilizes one processor, using a multiplexed control to maintain independent control of the inflation/deflation of each tyre associated with a given controller.

6. A device as claimed in claim 5, having independent indication of an inflation/deflation cycle.

7. A device as claimed in claim 3, further including two hoses for delivering nitrogen to two of the tyres, wherein the device includes independent tyre inflation control but with completion when the two hoses (5) are in an end state of an inflation/deflation cycle completion.

8. A device as claimed in claim 1, wherein at least one of the controllers is further in communication with a second pressure sensor, a second inflation valve, and a second deflation valve, and wherein the controller is adapted to initiate a cycle for adjusting the nitrogen content and pressure in a pair of the plurality of tyres, with simultaneous completion at the end of the cycle.

9. A device as claimed in claim 1, mounted on a wheeled, metal stand (13), for portability.

10. A device (1) for effecting automatic nitrogen filling from a nitrogen source, or nitrogen-for-air substitution, for the simultaneous inflation/deflation of a plurality of vehicle tyres, comprising:
    multiple controllers (17), each of said controllers adapted to deliver nitrogen to a plurality of the tyres based at least partially on a pressure within each of the plurality of tyres, each controller being in communication with each of the following:
        multiple individual displays (8) for displaying the pressure in at least one of the tyres;
        multiple individual pressure sensors (9) for sensing the pressure in at least one of the tyres;
        multiple inflation valves (4) for receiving nitrogen from the nitrogen source and delivering the nitrogen to at least one of the tyres; and
        a deflation valve (11) for releasing pressure from at least one of the tyres;
    whereby the plurality of vehicle tyres may be inflated/deflated simultaneously, with user input interfaces (10) for pressure setting adjustments; and
    wherein each controller utilizes one processor, using a multiplexed control to maintain independent control of the inflation/deflation of each of the plurality of tyres associated with a given controller.

11. A device as claimed in claim 10, wherein each controller (17) includes a processor located on a PCB (7).

12. A device as claimed in claim 11, comprising means for enabling simultaneous setting of a target pressure by linking two of the multiple controllers (17) via an interface link between the processors.

13. A device as claimed in claim 10, the multiple controllers comprising a first and a second independent controller adapted to coordinate simultaneous completion of inflation/deflation associated with at least two individual displays (8).

14. A device as claimed in claim 10, wherein each of the multiple controllers is adapted to effect independent completion of inflation/deflation of individual tyres and independently indicate completion of a given inflation/deflation cycle.

15. A device as claimed in claim 10, further comprising means for independent indication of completion of an inflation/deflation cycle.

16. A device as claimed in claim 10, further including two hoses for delivering nitrogen to two of the tyres, wherein the device includes independent tyre inflation control but with completion when the two hoses (5) are in an end state of an inflation/deflation cycle completion.

17. A device as claimed in claim 10, mounted on a wheeled, metal stand (13), for portability.

* * * * *